United States Patent [19]

Markarian et al.

[11] 3,937,869
[45] Feb. 10, 1976

[54] FORCE SENSING CONTROL APPARATUS AND METHOD FOR ELECTRIC ARC FURNACES

[75] Inventors: Kegham M. Markarian, University Heights; Thomas M. Maloney, Cleveland, both of Ohio

[73] Assignee: Republic Steel Corporation, Cleveland, Ohio

[22] Filed: Oct. 8, 1974

[21] Appl. No.: 513,124

[52] U.S. Cl. .................................................. 13/13
[51] Int. Cl. .......................................... H05b 7/00
[58] Field of Search ............................ 13/1, 12, 13

[56] References Cited
UNITED STATES PATENTS

| | | | |
|---|---|---|---|
| 3,179,734 | 4/1965 | Redel et al. | 13/12 |
| 3,405,219 | 10/1968 | Sivet | 13/1 |
| 3,408,447 | 10/1968 | Beck | 13/13 |

Primary Examiner—R. N. Envall, Jr.
Attorney, Agent, or Firm—Watts, Hoffmann, Fisher & Heinke Co.

[57] ABSTRACT

A force sensing control apparatus and method is disclosed for detecting forces which resist movement of a motor driven electrode system in an electric arc furnace. Force sensing circuitry monitors forces applied to an electrode system as it is positioned with respect to the furnace and force responsive controls inhibit electrode movement, hence preventing damage to the electrode or to its support structure, in response to predetermined changes in sensed reaction forces during positioning of the electrode. Compensating circuitry continuously compensates for changes in forces arising from electrode weight variations and position changes of the electrode support structure so that the sensitivity of the control apparatus to applied forces which can damage electrode system remains consistently high.

17 Claims, 9 Drawing Figures

FORCE SENSING CONTROL APPARATUS AND METHOD FOR ELECTRIC ARC FURNACES

BACKGROUND OF THE INVENTION

This invention relates to electric arc furnaces, and more particularly to an improved force sensing apparatus and method for controlling travel of an electrode as it is positioned in a furnace to prevent breakage of the electrode and/or damage to components associated with the electrode.

In conventional operation of an electric arc furnace, an electric arc is established between an electrode and a conductive charge of material in the furnace to melt the furnace charge. Electrode systems in arc furnaces include an electrode, usually formed by a large rod-like member which projects downwardly into the furnace, and a movable electrode support structure, formed by a mast and an electrode holder, located outside the furnace. A drive motor lowers and raises the electrode support structure to move the electrode toward and away from the furnace charge. The electrode is connected to an electrical power supply which provides power for establishing the arc.

An arc is established as the electrode is moved toward the charge. After the arc is established, it is stabilized and maintained by controlling the position of the electrode relative to the charge in response to sensed arc conditions. Arc condition responsive drive motor control circuitry has commonly been employed for governing positioning of the electrode relative to the furnace charge in response to sensed arc conditions after an arc is established.

In the absence of an arc between the electrode and the furnace charge, properly functioning arc condition responsive drive motor controls operate the drive motor to advance the electrode toward the furnace charge. When an arc fails to be properly established as the electrode approaches the furnace charge the electrode drive motor will drive the electrode into the charge. In the absence of drive motor controls responsive to the proximity of the electrode to the furnace charge, damage to the electrode is virtually inevitable.

A common reason for failure to establish a stable arc is that the furnace charge includes materials which will not conduct a sufficient amount of current to establish an arc. In recent years the quality of scrap used for arc furnace charges has deteriorated in that increased amounts of nonconductive materials, such as pit scrap, concrete, wood, lime, coal, etc., are commonly present in furnace charges. Accordingly, the possibility of electrode damage resulting from electrodes being driven into nonconductive material in the furnace charge occurs more frequently than in the past.

Electrodes used in arc furnaces are of two basic types which are commonly referred to as "consumable" and "nonconsumable." The so-called nonconsumable electrodes are usually constructed of connected, rod-like sections formed by graphite, or an equivalent material, and are actually consumed relatively slowly during use due to arc erosion and oxidation. Usage of nonconsumable electrodes is widespread and these electrodes, because of the nature of the material from which they are constructed, are relatively easily broken by contact with nonconductive material in the furnace charge.

Nonconsumable electrodes are characterized by having relatively high compressive strength and low flexural strength. Thus these electrodes can usually withstand purely axial loads resulting from vertical contact with a horizontally disposed furnace charge during lowering of the electrode with breaking. However, when such an electrode contacts a nonhorizontal surface defined by the furnace charge, substantial transverse loads can be applied to the electrode which tend to flex it. The flexural strength of these electrodes is so low that transverse loads of relatively small magnitudes can break an electrode.

Consumable electrodes generally consist of a metallic material which is consumed during usage at a much greater rate than the nonconsumable electrodes. Consumable electrodes are structurally more durable than the nonconsumable electrodes in that they can withstand greater flexural loads, but these electrodes can also be broken or otherwise damaged when driven into engagement with the furnace charge.

Breakage of nonconsumable electrodes resulting from the electrodes being driven into engagement with the furnace charge in the absence of an arc has become a serious problem in the industry not only because of the direct costs incurred as a result of breaking the electrodes themselves, but also as a result of consequent production losses and repair and replacement costs. Electric arc furnaces are normally "three-phase" furnaces in that each furnace includes three separate electrode systems. When an electrode is broken it normally breaks off at the juncture of electrode sections nearest the electrode holder leaving a large broken-off portion in the furnace. The broken-off portion may or may not be salvagable but in any event furnace operation must be terminated to enable replacement of the broken electrode. Extended idle time of a three-phase furnace for repair and replacement of one electrode results in substantial production losses as well as exposing the unbroken electrodes of the remaining phases to excessive oxidation. Accordingly, attempts have been made to alleviated or avoid the problem of electrode breakage.

An obvious technique for preventing the electrode from being driven into the charge is to visually monitor movement of the electrode towards the charge in the event an arc is not established. Unfortunately, this technique is impractical because in order for an operator to visually monitor the position of any one electrode system in a three-phase furnace, a furnace door must be opened. In most circumstances, however, the geometry of the furnace, the charge, and the electrodes in the furnace is such that an operator cannot visually determine the distance between the electrode tip and the charge. Furthermore, opening furnace doors during operation of the furnace is a safety hazard. For these reasons visual monitoring of electrode positions is not a feasible or desirable solution to the problem.

One known prior art control system has been proposed which attempts to sense physical engagement of the electrode with the furnace charge and to retract the electrode from the charge. The proposed control system senses force variations on the electrode system which act along or parallel to the electrode axis and which may be indicative of compression of the electrode due to engagement with the charge. In this system an initial electrical signal level indicative of forces produced by electrode system weight is established and sensed by the control system. When the electrode engages the furnace charge, an axial reaction force is applied to the electrode and the signal level changes in accordance with the magnitude of the sensed change in the axial force. If the change in signal level is sufficiently great the control system causes the electrode to be lifted from the charge.

After the electrode is retracted from the furnace charge, in accordance with conventional arc furnace operation, the furnace is opened and conductive material, such as aluminum, is placed beneath the electrode, or mechanical stirring of the charge is effected to move conductive charge material beneath the electrode. The electrode is then advanced toward the charge so that an arc can be established between the conductive charge material and the electrode. This procedure usually results in the nonconductive material, which was originally engaged by the electrode, being melted or burned up after an arc has been established.

While the prior art control system represents an improvement over systems which do not employ any controls to avoid electrode breakage, the proposed control system exhibits seemingly irreconcilable sensitivity problems. On one hand the system does not appeear to be sufficiently sensitive to prevent breakage of nonconsumable electrodes in many instances where the electrode is driven into the furnace charge. At the same time the system is sensitive to sensed force changes resulting from electrode erosion and electrode system position changes and as a consequence there is a tendency for these sensed forces to falsely indicated that the electrode has engaged the furnace charge. This can result in needless withdrawal of the electrode from the charge.

It should be appreciated that the materials forming the furnace charge often provide an extremely irregular charge surface. When an electrode engages the charge the direction of the engaging force applied to the electrode by the charge can range from a direction nearly at right angles to the electrode axis to a direction along or parallel to the electrode axis, depending on the angle of engagement between the electrode and the charge. The magnitude of the axial component of a given electrode engaging force varies according to the angle at which the force is applied to the electrode. Hence engaging forces applied to an electrode which have small magnitude axial components can, in fact, have transverse components which are sufficient to break the electrode. Since the prior art control system relies on sensing only the magnitude of changes in axial forces acting on the electrode, the system inherently lack sensitivity to actual breaking forces applied to the electrode.

As indicated previously, electrodes are consumed during use which results in electrode weight reductions. The weight reductions reduce the level of the gravity forces acting on the electrode systems thus changing the net axial force applied to the electrode system. Over a period of time the force changes on an electrode system due to electrode consumption can be quite large.

Each electrode system is connected to an electrical power supply capable of producing the required arc via a power cable which is quite massive (e.g., about eight inches in diameter). Because the electrode systems must be capable of substantial vertical motion relative to the furnaces, the length of the power cables must be sufficient to accommodate the full travel of the electrode system. The cables are commonly suspended between the power supply and the electrode system and defined catenary curves which vary according to electrode system position. The axial component of the force exerted on the electrode system by the power cable can change appreciably as the electrode system changes position relative to the furnace.

The magnitude of the changes in axial forces acting on electrode systems which are attributable to electrode consumption and electrode system positon changes can be relatively great over a period of time but these force changes are nondetrimental in that they do not represent any threat of electrode breakage. The prior art system is undesirably sensitive to these nondetrimental force changes. Since the prior art control system detects magnitude changes of axial forces applied to the electrode system, and since both electrode breaking forces and nondetrimental forces have axial lines of action, the prior art control system necessarily responds to the total magnitude changes of these forces. Consequently, the sensitivity of the prior art system to actual breaking forces changes as the furnace operates and relatively frequent manual compensation is required to re-establish the desired sensitivity. As a result, while the prior art system did reduce electrode breakage somewhat, electrode breakage remained a serious problem because of the lack of sensitivity to actual electrode breaking forces, and "false tripping" of the control systems, i.e., withdrawal of the electrode from the charge in the absence of any engagement between the electrode and the charge, would become a problem.

Electrode systems for arc furnaces have been subject to damage from causes other than driving the electrode into the furnace charge. When an electrode is withdrawn from a furnace, the upward travel of the electrode support structure must be limited. Limit switches governing the extent of withdrawal of electrodes from furnaces have commonly been located near the uppermost position to which the electrode support structure may be safely raised. The limit switches frequently fail because of the hostile environment in which they must be located. When the limit switches do fail the electrode support structure moves beyond the limit switches and engages mechanical stops which prevent further movement. Engagement with the stops can result in damage to the electrode support structure, the electrode system drive, and/or to drive transmission components between the drive and the support structure. The prior art control systems have not provided fail-safe electrode system operation in the event of upper limit switch failures.

When an arc has been established and stabilized, the electrode may be broken by furnace charge cave-ins during the arcing process. The electrode support structure can be damaged as a consequence of electrode breakage by a furnace charge cave-in in the absence of suitable controls. Cave-in breakage occurs when the electrode melts or burns the charge immediately underneath its nose or tip leaving unmelted charge nearby at a higher elevation than the electrode tip. The elevated unmelted charge may be unstable and thus vibrations encountered during operation of the furnace may cause some or all of it to cave-in and tumble against the electrode causing breakage. Electrodes tend to break off at a location adjacent the electrode holder so that a relatively short electrode portion remains connected to the holder and a relatively long, broken-off electrode portion remains in the furnace.

Breakage of the electrode destroys the arc and, in an effort to re-establish the arc, the arc condition responsive control circuitry causes the remaining electrode portion and its support structure to advance toward the charge to re-establish the arc. If the broken-off electrode portion is sufficiently long to stay upright due to the upper, broken end resting against the furnace roof, an arc can be struck between the broken-off electrode portion and the electrode holder, causing damage to the electrode holder and the support structure.

SUMMARY OF THE INVENTION

In accordance with the principles of the present invention movement of an electrode system in an arc furnace is governed in part by a force sensing control which discriminates between potentially damaging force changes applied to the electrode system and nondetrimental force changes applied to the system. By discriminating between potentially damaging force changes and those which are nondetrimental, the sensitivity of the force sensing control to potentially damaging force changes is maximized. Still further, changes in nondetrimental forces applied to the electrode system are compensated for so that collective changes in detected electrode system force levels attributable to non-detrimental force changes are ineffective to alter the sensitivity of the control.

Potentially damaging forces acting on electrode systems are characterized by having rates of change of magnitude with respect to time which are great compared to the rates of change of magnitude with respect to time of nondetrimental forces. For example, when an electrode is driven into engagement with the furnace charge, the magnitude of the reaction force between the electrode and the charge increases rapidly regardless of the angle of engagement between the charge and the electrode. Accordingly, the component of any such force along the axis of the electrode increases rapidly even if the actual change in force magnitude is small. Conversely, nondetrimental force changes acting axially of the electrode due to electrode erosion and/or position changes of the electrode system occur slowly even though the magnitudes of these force changes, over a period of time, may be great.

Even though these force changes are all applied axially of the electrode and in the same direction of application, the forces can be separately identified according to their rates of change of magnitude with respect to time. This enables the use of electrode system positioning controls which are highly sensitive to the application of potentially damaging forces to the electrode systems and which compensate for nondetrimental force changes so that the electrode system positioning controls are effectively insensitive to nondetrimental force changes. It should also be appreciated that since the electrode system positioning controls respond primarily to rates of change of applied force, the controls effectively anticipate the actual application of damaging forces to the electrode system and therefore are substantially more sensitive than known prior art controls.

An arc furnace system constructed according to the present invention includes an arc furnace provided with an electrode system, a driving arrangement for the electrode system and a control system for governing operation of the electrode drive. The electrode system includes an electrode and an electrode support structure including a movable mast and a electrode holder. The electrode system is connected to an electrical power supply for establishing an arc between the electrode and the furnace charge by a power cable which is slung between the electrode system and the arc power supply. In a preferred embodiment of the invention the driving arrangement for the electrode system includes an electric drive motor connected to the mast by a cable system so that movement of the electrode system relative to the furnace is governed by controlling operation of the drive motor.

The drive motor is controllable by an automatic motor controller which is operated by an arc condition sensing control and by an electrode system force sensing control. The arc condition sensing control detects the arc current and voltage applied to the electrode and governs operation of the drive motor to establish and maintain an optimum arc between the electrode and the furnace charge. Accordingly, the arc condition sensing control operates the drive motor, via the automatic controller, to advance the electrode towards the charge until an optimum arc is established and continues to control positioning of the electrode to maintain an optimum arc.

During normal operation of the furnace system the force sensing control detects engagement of the electrode system with an obstruction to its movement and terminates operation of the drive motor via the automatic controller, regardless of the arc conditions sensed by the arc condition sensing control. If an arc is not established as the electrode is lowered toward the charge the force sensing control detects engagement of the electrode with the charge and terminates operation of the motor.

When the electrode has engaged the furnace charge and the motor is stopped, the electrode remains engaged with the furnace charge. It can then be determined from the arc condition sensing control whether current is flowing from the arc power supply to the electrode. If so, the electrode is maintained in position until the obstruction is the furnace charge has been melted or burned away from the electrode tip, after which normal operation of the arc furnace is resumed. This method of operating the furnace effectively increases production in that when the electrode engages the charge the furnace need not always be shut down, the electrodes withdrawn, and additional conductive material added to the charge.

If a negligible amount of current flow through the electrode is sensed, the electrode is withdrawn from the furnace, conductive materials are located beneath the electrode tip and normal furnace operation is resumed.

The force sensing control governs operation of the motor during upward and downward movement of the electrode and terminates operation of the motor when the electrode system encounters an obstruction to its motion. The force sensing control includes a force sensing circuit for producing force signals which vary according to sensed changes in forces applied to the electrode system, an upward motion force signal responsive control and a downward motion force signal responsive control, both of which are associated with the sensing circuitry. The force signal responsive controls are individually effective to terminate operation of the drive motor.

During operation of the furnace and when the electrode system is moved downwardly toward the furnace charge, the electrode system may be subjected to force changes resulting from electrode consumption, force changes caused by electrode system position changes, and force changes resulting from the electrode engaging the furnace charge. These force changes all alter the force signal produced by the force sensing circuitry and such changes in the force signal are transmitted to the downward motion force signal responsive control.

The downward motion force signal responsive control includes force signal discriminator circuitry which effectively discriminates between force signal changes depending on the rate of change of the signal value with respect to time, and a control signal circuit operable by the discriminator circuitry for terminating operation of the drive motor. In the preferred embodiment, when a detected force change occurs relatively slowly, the rate of change of the force signal value with respect to time is low. When the detected force change occurs relatively quickly, the rate of change of the force signal value with respect to time is high. The discriminator circuitry detects the high rate of signal value change and causes termination of operation of the electrode system drive motor via the control signal circuit.

Force signal value changes attributable to nondetrimental force changes on the electrode system are compensated for by the downward motion force responsive control. In the preferred embodiment of the invention, the discriminator circuitry includes a compensating signal generator which detects the force signal changes caused by electrode consumption and electrode system position changes and produces compensating signals which are related to such force signal changes. The compensating signal and the force signal are both fed to a signal processor which has an output connected to the control signal circuit. So long as the compensating signals and the force signals bear a predetermined relationship with each other, the signal processor output is ineffective to cause the control signal circuit to terminate operation of the drive motor.

As a result, collective changes in force signal values due to electrode consumption and/or electrode system position changes are compensated for by operation of the compensating signal generator. Even though these force signal value changes may be quite large over a period of time, the force signal changes are, collectively or individually, ineffective to terminate operation of the drive motor or to change the sensitivity of the force responsive control to force changes caused by engagement of the electrode with the furnace charge.

The compensating signal generator includes circuit elements which prevent a compensating signal from being produced in response to force signal value changes which exceed a predetermined rate and which are indicative of the electrode engaging the furnace charge. The circuit elements effectively limit the compensating signal generator from responding to force signal value changes which exceed the predetermined rate. The resulting limited output from the compensating signal generator is fed to the signal processing circuit along with the force signal and since the force signal is uncompensated the signal processor circuit renders the control signal circuit effective to terminate operation of the drive motor.

The upward motion force responsive control prevents possible damage to the electrode system as a result of the electrode system being engaged with mechanical stops at the upper limit of its travel as well as in circumstances where foreign materials become lodged between the mast and its supports and strongly resist raising of the electrode system. The upward motion force responsive control includes a comparator for comparing force signal values representative of obstructions to upward motion of the electrode system with a preset reference value so that when such force signal values exceed the preset reference value an output signal from the comparator terminates operation of the electrode system drive.

When the electrode system has engaged the upper limit stops, or its upward motion is otherwise obstructed, and the upward motion force responsive control has terminated operation of the electrode system drive, the load imposed on the electrode system by the upper limit stop remains relatively high until the electrode system drive moves the electrode system downwardly. When the electrode system moves downwardly the load is abruptly removed from the electrode system. The effect of the load reduction on the force signal is the same as if the electrode had engaged the furnace charge and the downward motion force responsive control tends to terminate the downward motion of the electrode system. Such operation of the downward motion force responsive control is referred to as false tripping.

In the preferred embodiment of the invention the upward motion force responsive control is associated with disabling circuitry which is effective to disable the downward motion force responsive control whenever the electrode system encounters an obstruction to its upward motion so that the electrode system can be moved from the upper stops without its motion being terminated by the downward motion control.

A general object of the present invention is the provision of a new and improved method and apparatus for controlling movement of an electrode system in an electric arc furnace which is highly sensitive to potentially damaging forces acting on the electrode system and by which electrode system movement is controlled to substantially reduce the possibility of damage to the electrode system from such forces.

Other features and advantages of the invention will become apparent from the following description of preferred embodiments made with reference to the accompanying drawings which form part of the specification.

BRIEF DESCRIPTION OF THE DRAWINGS

FIG. 4b is a functional block diagram of portions of the control system illustrated in FIG. 4a;

DESCRIPTION OF PREFERRED EMBODIMENTS

Figure 1:
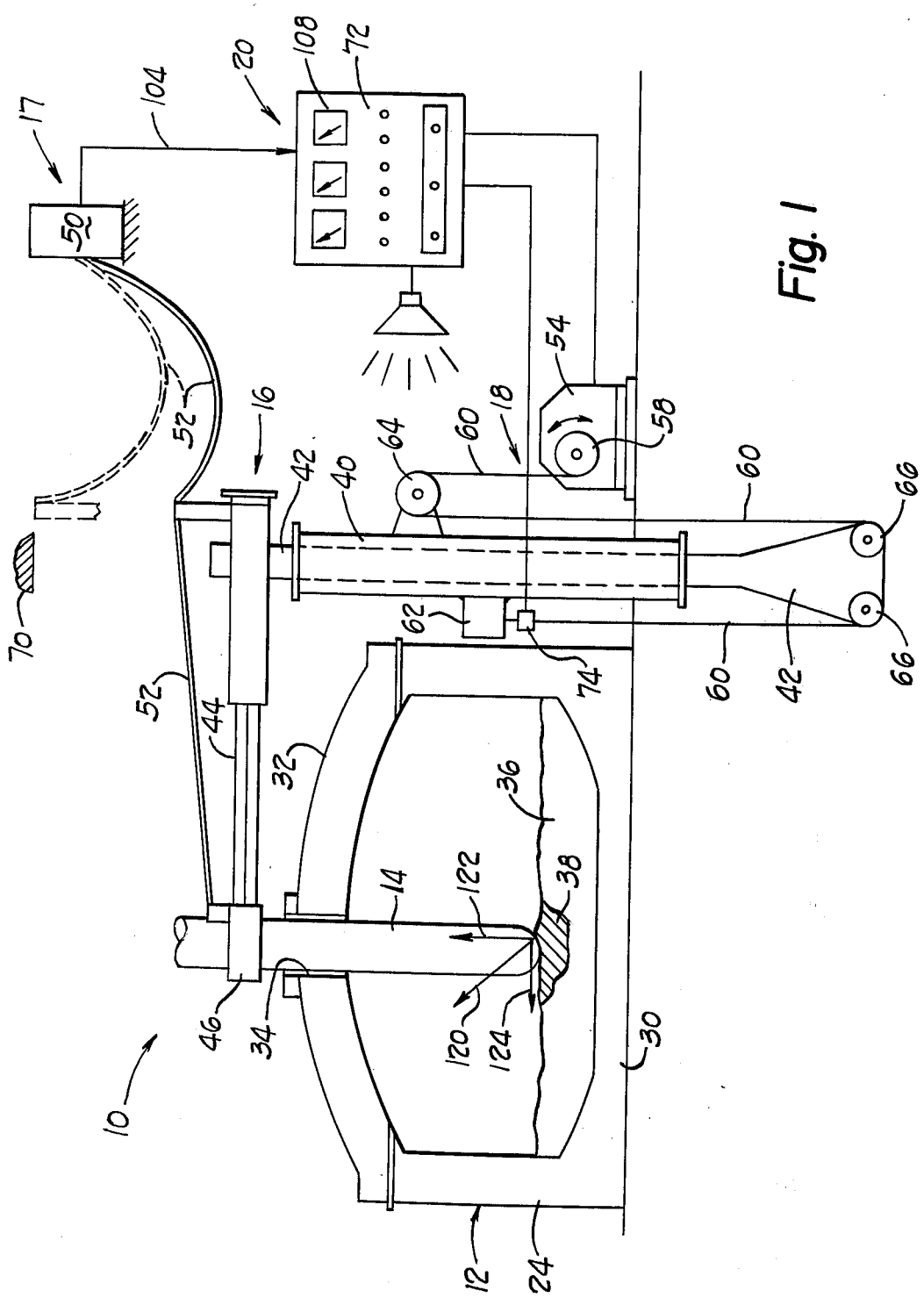
FIG. 1 is a schematic view of an electric arc furnace system constructed according to a preferred embodiment of the present invention.

An arc furnace system 10 embodying the present invention is illustrated in FIG. 1 of the drawings and includes an arc furnace 12, an electrode system including an electrode 14 and an electrode support structure 16, an arc power supply unit 17 for providing arc producing electric energy to the electrode 14, a drive unit 18 for positioning the electrode system with respect to the furnace 12, and a control system 20 for governing operation of the drive unit 18 to control the positioning of the electrode system with respect to the furnace.

The furnace system 10 is preferably a three-phase furnace system in that it includes three electrode systems and their associated components. The furnace system 10 is illustrated with only one electrode system and its associated equipment for the sake of simplicity.

The furnace 12 includes a body 28 which defines a floor 30. A top or roof section 32 extends over the body 28 and defines a hole 34 through which the electrode 14 projects into the furnace. A charge of scrap material is illustrated disposed within the furnace body 28 which includes a nonconductive charge portion 38 located directly below the electrode 14.

The electrode 14 is preferably a nonconsumable graphite electrode having a generally cylindrical rod-like configuration and is formed by a series of joined electrode sections (not illustrated). The electrode 14 projects generally vertically through the hole 34 into the furnace. The electrode support structure 16 comprises a stationary guide structure 40 situated near the furnace, a support column 42 which is supported by the guide 40 for generally vertical movement relative to the furnace, a mast 44 which extends from the support column 42 over the top of the furnace 12 and an electrode holder 46 which interconnects the mast 44 and the electrode 14. The components of the support structure 16 can be of any suitable or conventional construction and are therefore not described in further detail.

The arc power supply unit 17 is schematically illustrated in FIG. 1 and preferably includes a suitable power transformer 50 which is positioned near the furnace 12. A power cable 52 is slung between the transformer 50 and the electrode system so that electrical power for establishing an arc between the electrode 14 and the furnace charge 36 is supplied to the electrode from the transformer 50 via the power cable 52. The cable 52 is preferably relatively slack to enable vertical movement of the electrode system relative to the furnace and the power supply unit 17 without overstressing the power cable. Accordingly the power cable defines a catenary curve in its section extending between the power transformer 50 and the electrode system. As the electrode system moves upwardly and downwardly the curvature of the catenary changes resulting in different reaction forces being exerted axially on the electrode system by the cable. For the purposes of illustration, the transformer 50 is stationarily supported adjacent the uppermost level of the electrode system travel so that the cable force exerted axially on the electrode system tends to be reduced as the electrode system moves downwardly and vice versa.

The drive unit 18 preferably includes an electric drive motor 54 which is connected to the electrode system by a cable drive transmission so that the electrode system is moved upwardly and downwardly, depending upon the direction of rotation of the drive motor 54, via the drive transmission. The cable drive transmission preferably includes a winch 58 connected to an output shaft of the motor 54 and a cable 60 which is wound on the winch 58 and has a dead end which is fixed with respect to the anchor 62 on the guide structure 40. The cable 60 is reaved on a sheave 64 which is connected to the guide 40 and a pair of sheaves 66 which are supported at the lowermost end of the support column 42.

When the motor 54 is operated to drive the winch 58 in a clockwise direction, as viewed in FIG. 1, the cable 60 is played out from the winch and the electrode system is moved downwardly by gravity forces acting against the cable drive transmission. When the motor 54 drives the winch 58 counterclockwise the cable 60 is taken up on the winch 58 to raise the electrode system relative to the furnace.

In the preferred embodiment, the winch 58 is provided with a suitable brake mechanism (not shown) which is engaged to prevent downward drifting movement of the electrode system.

The arc furnace system 10 also includes conventional safety devices for preventing damage to components of the system. These devices include: slack cable switches which are effective to stop operation of the motor 54 when slackness in the cable 60 is sensed in order to prevent the cable from being detrained from the sheaves; upper limit switches for sensing the approach of the electrode system towards its upper limit of travel (defined by a mechanical stop which is schematically illustrated at 70 in FIG. 1), and stopping operation of the motor 54 before the electrode system engages the mechanical stop 70; and, lower limit switches which sense the approach of the mast 44 towards the furnace top section 32 to stop operation of the motor 54 and prevent a collision between the mast and the furnace top section. These devices and their relationships to the drive motor 54 are conventional, as noted, and therefore are not illustrated or described in further detail.

The control system 20 is illustrated as housed in part by a control panel 72 which is accessible to the furnace operator. The control system 20 is effective to govern operation of the drive motor 54 to control positioning of the electrode system relative to the furnace. The system 20 is constructed and arranged so that the furnace operator can manually control positioning of the electrode system when desirable. The system 20 also controls the motor 54 automatically in response to sensed conditions of which the operator may be unaware.

In the preferred embodiment of the invention the control system 20 is provided with an electrical input signal from the power transformer 50 by which arc conditions between the electrode 14 and the charge 36 are sensed. Operation of the motor 54 is governed according to the sensed arc conditions to maintain a stable arc between the electrode and the charge. The control system 20 is also provided with an electrical input signal from a force transducer element, shown schematically at 74 in FIG. 1, which indicates changes in force levels acting on the electrode system in directions parallel to the electrode axis. Characteristic changes in these detected force levels indicate potentially damaging forces acting on the electrode system and the control system 20 responds by terminating operation of the motor 54.

The transducer element 74 is illustrated in FIG. 1 as disposed between the dead end of the cable 60 and the anchor 62 and when so connected it should be apparent that any change in the total force applied to the electrode system which has a component acting axially of the electrode, or parallel to the electrode axis, will change the level of force applied to the element 74 between the cable 60 and the anchor 62.

Figure 2A:
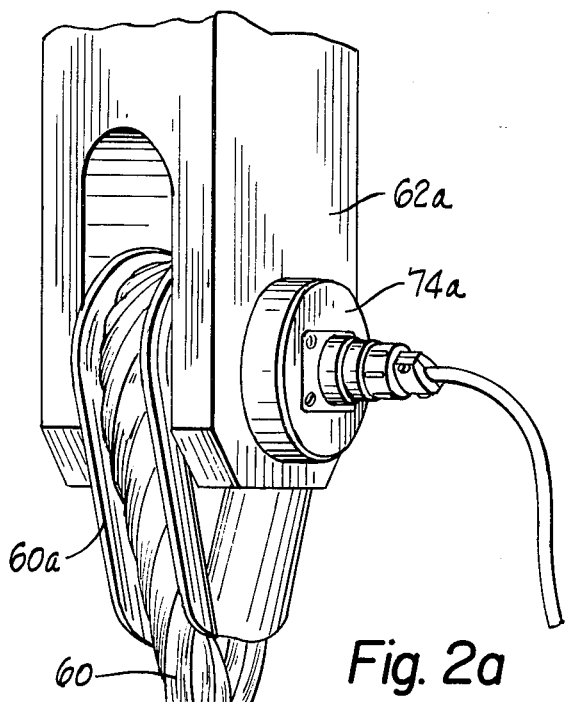
FIGS. 2a—2c are perspective views of alternative constructions of portions of the arc furnace system of FIG. 1 which are effective to sense forces acting on components of the arc furnace system.
Figure 2B:
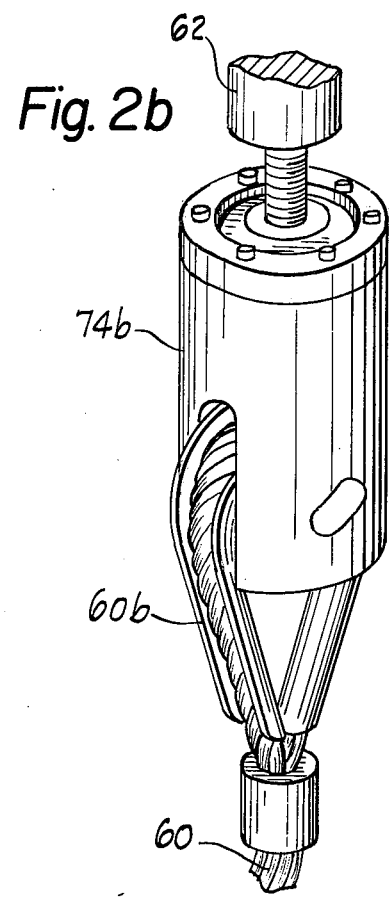
Figure 2C:
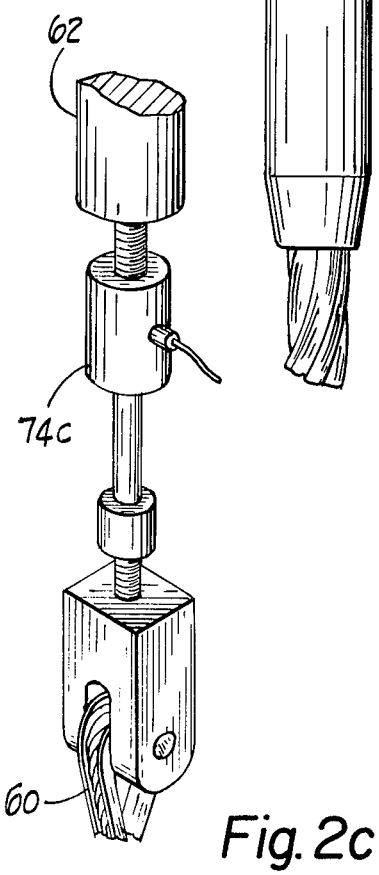

FIGS. 2a–c illustrate specific alternative constructions of transducer elements associated with the cable 60 and the anchor 62 for detecting axial force changes. As shown in FIG. 2a a transducer element in the form of a pin-type load cell 74a is used to join a cable end eyelet 60a to a clevis 62a which is connected to the anchor 62. The load cell 74a is positioned to sense the reaction force between the eyelet and the clevice. One suitable pin-type load cell is manufactured by Strainsert of Bryn Mawr, Pa., and is disclosed in U.S. Pat. No. 3,695,096.

In FIG. 2b, the transducer is rigidly connected to the anchor 62 and is acted on by the cable eyelet 60b. Here the transducer is a flat type load cell 74b, such as a cell manufactured by Strainsert of Bryn Mawr, Pa., and disclosed in Pat. No. 3,365,689.

In FIG. 2c, the transducer 74c is connected to the anchor 62 and is disposed in tension between the anchor and the cable 60. The cell 74c is a tension type load cell of the type manufactured by Lebow Associates, Inc., of Troy, Mich. Model 3127.

Figure 3:
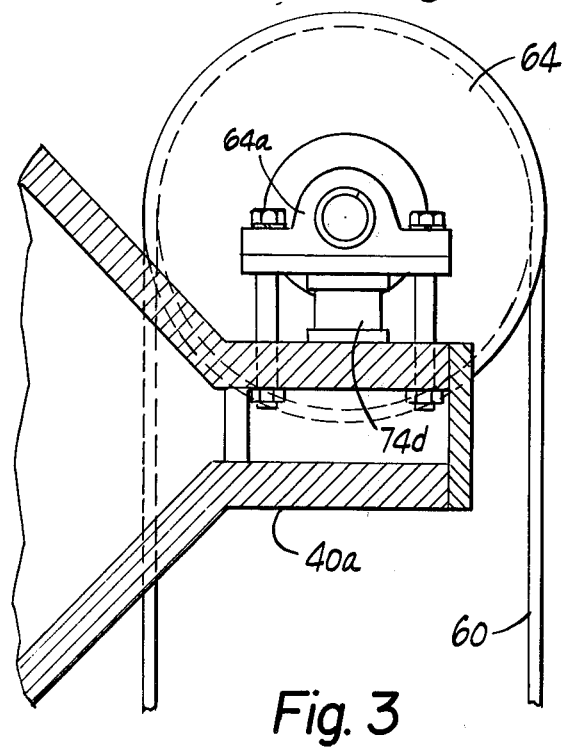
FIG. 3 is a side elevation of a sheave assembly forming part of an arc furnace system embodying the invention and which is associated with a force sensing element.

FIG. 3 illustrates an alternative location for the force sensing transducer element. As illustrated by FIG. 3 the sheave 64 is attached to the mast guide 40 by a support arm 40a. The arm 40a supports the sheave 64 and its shaft on a pillow block 64a. The transducer 74d is positioned for compression between the pillow block 64a and the support arm 40a and is responsive to changes in force applied by the cable 60 to the guide 40. The transducer 74d is preferably a compression type load cell manufactured by Lebow Associates, Inc., of Troy, Mich., Model 3603.

The constructions described in reference to FIGS. 2 and 3 are illustrative of a few of the possible transducer element constructions and arrangements which can be employed to sense changes in axial forces acting on the electrode system. Other transducer types and mounting arrangements can be employed if desired.

Figure 4A:
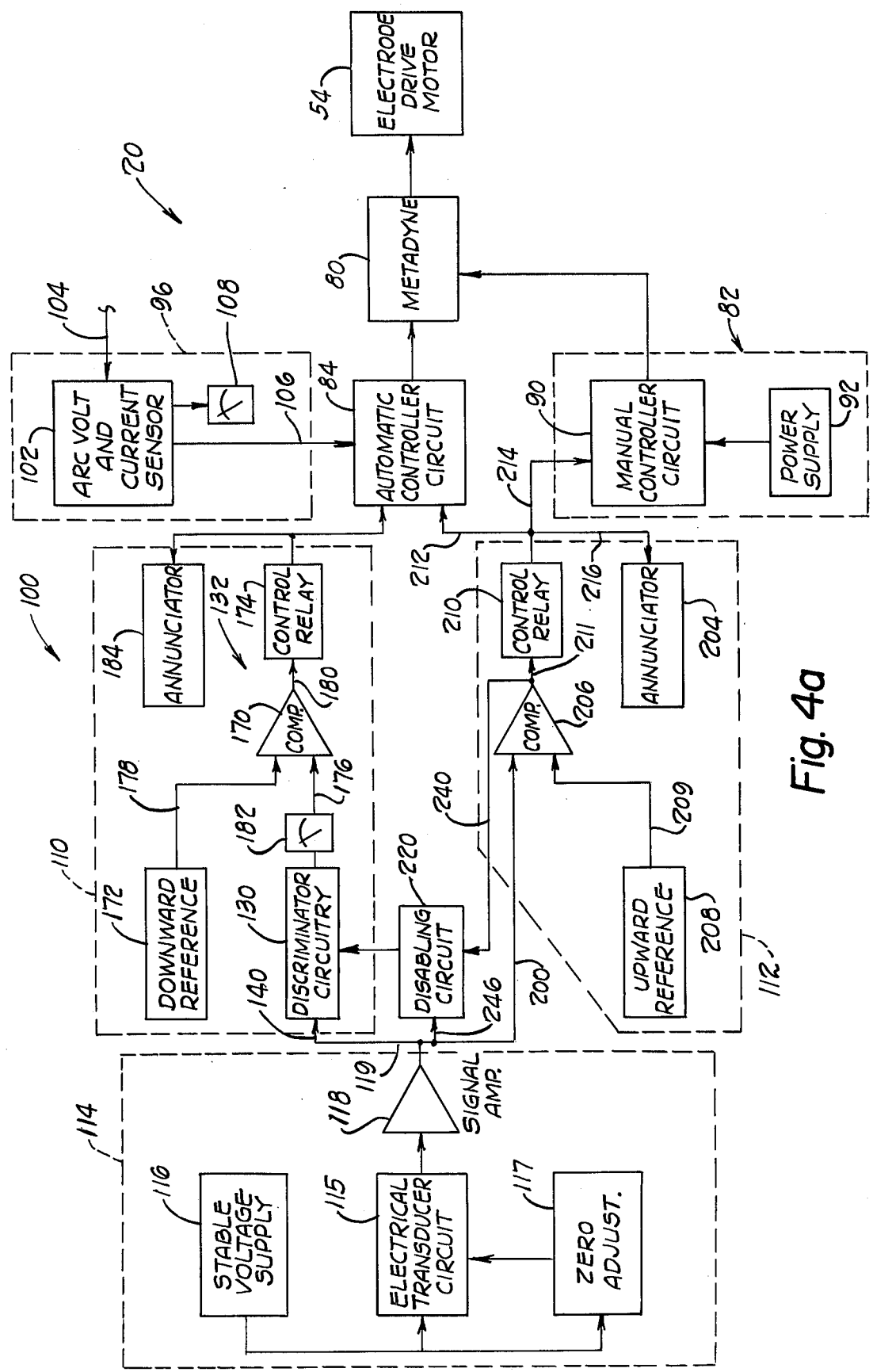
FIG. 4a is a functional block diagram of a control system embodying the present invention which is associated with a drive motor for controlling positioning of an arc furnace electrode system.

Referring now to FIG. 4a, the control system 20 is schematically illustrated associated with the motor 54. As illustrated in FIG. 4a the control system 20 includes a controlled power source 80 for operating the motor 54, a manual controller 82 by which the furnace operator can govern operation of the motor 54 via the source 80, and an automatic controller 84 by which operation of the motor 54 is governed via the power source 80 in response to sensed conditions. The power source 80 is preferably a Metadyne generator, or equivalent device, and the controllers 82, 84 are suitably constructed circuits which effect operation of the generator 80 to start and stop the motor 54 and to drive the motor in opposite rotational directions.

The manual controller 82 includes a manual control circuit 90 and a power supply 92 and can be operated manually by the furnace operator to override control of the motor 54 by the automatic controller 84 whenever that is desirable. The furnace operator commonly operates the furnace by conditioning the automatic controller 84 to carry out desired functions such as raising the electrodes and resuming normal operation subsequent to electrode withdrawal from the furnace. This is accomplished by actuation of suitable control switches on the control enclosure 72. In short, the manual controller 82 is used sparingly.

The automatic controller 84 is associated with an arc condition sensing control circuit 96 and a force responsive control circuit generally indicated by the reference numeral 100 which individually govern operation of the automatic controller 84 in response to sensed arc conditions and sensed electrode system force changes, respectively.

The arc condition control circuitry 96 controls operation of the motor 54 via the controller 84 in response to sensed arc current and voltage conditions in the furnace so that the electrode system is properly positioned to maintain a stable, optimum arc current and arc voltage relationship in the arc between the electrode 14 and the furnace charge 36. The circuitry 96 includes an arc voltage and current sensing circuit 102 which is connected to the power transformer 50 via an input signal line 104. The sensing circuit 102 produces an output motor controlling signal which is transmitted to the controller 84 via an output line 106. An ammeter 108 is associated with the circuitry 96 to enable the furnace operator to visually determine the current flow to the electrode when such monitoring is desirable.

The character of the output signal on the line 106 is such that the controller 84 can be conditioned to operate the motor 54 in either direction at speeds depending upon the sensed arc current and voltage conditions. When automatic operation of the furnace system 10 is initiated by the furnace operator with the electrode system raised, the arc condition control circuitry 96 detects the absence of an arc between the electrode and the furnace charge and accordingly an output signal is delivered to the controller 84 which causes the motor 54 to to lower the electrode system relative to the furnace. As the tip of the electrode 14 approaches conductive material in the furnace charge 36 immediately below the electrode tip, an arc is established between the electrode and the furnace charge. Establishment of the arc is detected by the control circuitry 96 which in turn conditions the controller 84 to substantially slow the operation of the motor 54. When the optimum arc current and voltage levels are established between the electrode and the furnace charge, the control circuitry 96 is effective to stop the motor 54 and the electrode system is maintained in position with respect to the charge so long as the arc current and voltage levels remain stable.

Conditions within the furnace affect the arc current and voltage levels and the control circuitry 96 operates to move the electrode 14 toward or away from the charge to maintain the arc current and voltage at the optimum levels.

The force responsive control circuitry 100 is associated with the controller 84 for stopping the motor 54 whenever the electrode system encounters an obstruction to its movement which could otherwise damage the electrode system. The electrode system can encounter obstructions when moving upwardly relative to the furnace and when moving downwardly relative to the furnace. The control circuitry 100 accordingly includes a downward motion force responsive control 110 and an upward motion force responsive control 112 each of which is connected to a common force sensing circuit 114. Each control 110, 112 is associated with the controller 84 and is effective, via the controller 84, to stop the motor 54 in response to sensed forces resulting from an obstruction to the electrode system movement.

The force sensing circuit 114 comprises a force sensor circuit 115 including the transducer element 74, a regulated voltage supply 116 and a zero adjusting circuit 117 which combine to produce a D.C. analog signal which varies according to changes in forces applied to the transducer element 74. The signal is fed to the input of a linear signal amplifier 118. The amplifier output provides a D.C. analog force signal on an output line 119 which varies according to changes in forces applied to the transducer 74.

In the convention used in describing the illustrated embodiment of the invention the force signal on the line 119 is positive with respect to circuit ground and the voltage supply 116 and zero adjusting circuit 117 cooperate to enable the force signal level to be initially set within a desired voltage range.

When the electrode 14 is lowered towards the furnace charge either upon initiating operation of the furnace system 10 or at some time during its operation, the possibility exists that nonconductive furnace charge material may be located beneath the tip of the electrode. In these circumstances an optimum arc is not established between the electrode and the charge and the arc condition sensing control 96 conditions the controller to operate the motor 54 in a direction to drive the electrode into the charge.

When the electrode engages the charge the resultant force acting on the electrode, to the extent that force is not aligned with the electrode axis, has a component force acting at right angles to the electrode axis, and a component force acting along or parallel to the electrode axis. Since the electrode 14 has a low flexural strength, a relatively small component force acting at right angles to the electrode axis can load the electrode sufficiently to break it. This condition is illustrated in FIG. 1 with the resultant force indicated by the vector 120, the axial component force indicated by the vector 122, and the potential breaking force component indicated by the vector 124.

The existence of potential breaking forces can be sensed by sensing axial force levels applied to the electrode system since the breaking forces are always accompanied by an axial force component which acts towards the electrode and tends to reduce the load of the electrode system on the cable 60.

As noted previously, electrode weight loss due to its consumption and changes in electrode system position also cause changes in the axial forces acting on the electrode system. It should be apparent that axial force changes caused by electrode erosion and electrode system position changes, even if they are of great magnitude, do not represent any potential hazard to the electrode system while axial force changes acting in the same effective direction of application due to engagement of the electrode with the furnace charge represent the existence of forces which can break the electrode.

The force sensing circuit 114 (FIG. 4a) reacts to all of these axial force changes by producing a negative going force signal on the line 119. The downward motion force responsive control 110 is connected to the line 119 and is normally conditioned to sense and respond to negative going force signals on the line 119.

Figure 4B:
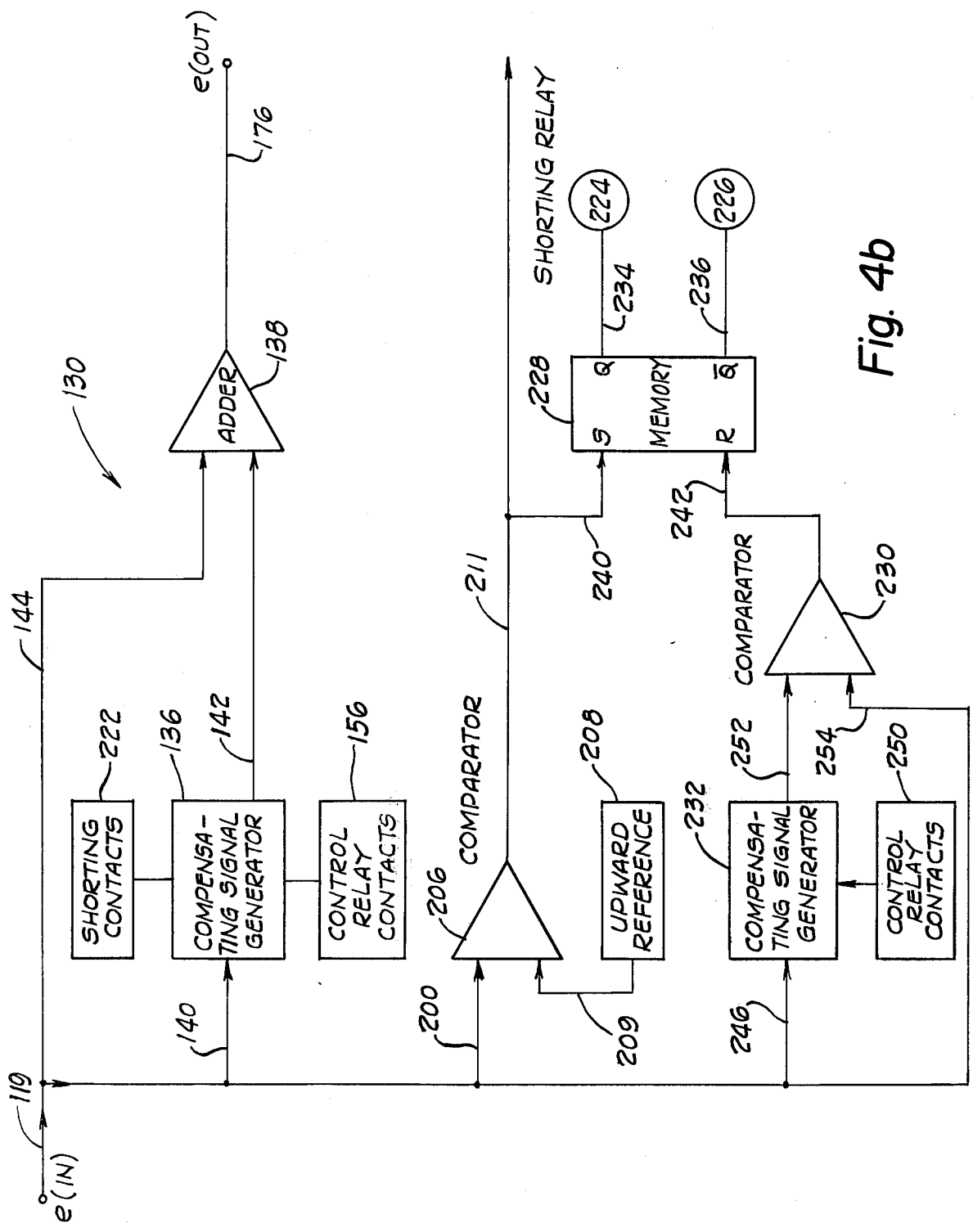

As illustrated by FIG. 4a the downward force responsive control comprises a discriminator circuit 130 and a control signal producing circuit 132 which coact to terminate operation of the motor 54 via the controller 84 when the electrode engages the furnace charge. Referring to FIG. 4b the discriminator circuit 130 includes a compensating signal generator 136 and a signal processor 138, preferably formed by a conventional adder. The input of the compensating signal generator is connected to the line 119 by a line 140 and its output is connected to one input of the adder by a line 142. The other input of the adder 138 is connected to the force signal on the line 119 by a line 144.

The compensating signal generator 136 is constructed and arranged so that its output signal can vary at a predetermined, limited rate in response to negative going input signals. Hence when the input force signal to the compensating signal generator is slowly negative going, the compensating signal generator output level can change at the same rate as the input force signal. When the input force signal goes negative at a rate greater than the limiting rate of the compensating signal generator, the output from the signal generator continues to change at its limiting rate regardless of the level of the force signal relative to the output of the compensating signal generator.

Nondetrimental force changes on the electrode system cause the force signal level on the line 119 to shift gradually in a negative sense and these gradually negative going signals are detected at the input of the compensating signal generator. The signal generator 136 responds by producing a compensating signal on its output line 142 corresponding to the force signal, inverted. That is to say, if the instantaneous value of the force signal is 5 volts positive, the instantaneous value of the compensating signal output from the generator 136 is about 5 volts negative.

The compensating signal and the force signal itself are fed to the adder 138 which functions to algebraically add the signals at its inputs and produce an output signal corresponding to the sum of the input signals. Since the compensating signal is substantially the inverse of the force signal the sum of these signals is substantially zero and the adder output signal is substantially zero.

When the electrode engages the furnace charge a rapidly negative going force signal is produced on the line 119. The compensating signal generator 136 is incapable of producing an output signal which changes as rapidly as the input force signal rate of change. The output siganl from the compensating signal generator 136 thus changes at its limiting rate and lags the force signal. The output from the signal generator 136 no longer corresponds to the inverse of the force signal on the line 119 and the adder 138 produces an output signal having a level which corresponds to the difference between the output from the signal generator 136 and the force signal on the line 119.

Figure 5:
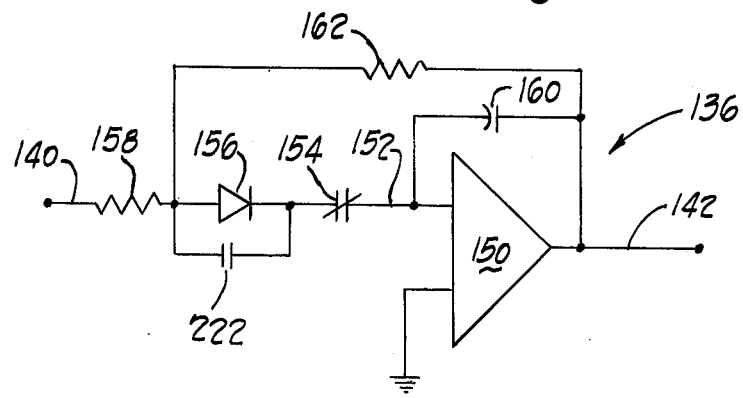
FIG. 5 is a circuit diagram of a portion of the circuitry illustrated by FIGS. 4a and 4b.

FIG. 5 schematically illustrates the compensating signal generator circuitry of the preferred embodiment. The generator 136 includes an inverter 150 having its input connected to the force signal on the line 119 through an input line 152, normally closed relay contacts 154, a diode 156, an input resistor 158 and the input line 140. The output of the inverter 150 is connected to the output line 142. The diode 156 is poled to conduct forwardly from the line 119 to the inverter input line 152 so that positive going force signal voltage levels on the line 119 render the diode 156 conductive to provide an input signal to the inverter which in turn produces a compensating signal on the output line 142.

When negative going force signal voltage levels appear on the line 119 the level of the input signal on the inverter input does not see the change because of the diode 156. The level actually seen by the inverter input is the voltage on the capacitor 160. The voltage level on the inverter input line 152 is permitted to decay towards the negative going force signal up to a predetermined, limited rate of decay. Signal decay elements are associated with the compensating signal generator for this purpose. The signal decay elements include a capacitor 160 connected in parallel with the inverter between the lines 142, 152, a resistor 162 connected around the capacitor from the line 142 to the anode of the diode 156, and the diode 156 itself. The characteristics of the diode 156 are such that a limited amount of cathode to anode current flow can occur when its anode is negative with respect to its cathode. This "leakage" of the diode 156 enables the capacitor 160 to discharge through the leakage path provided by the diode 156 and the resistor 162. The rate at which the capacitor 160 discharges is controlled by the diode 156 and the resistor 162.

When the capacitor discharges, the inverter input voltage on the line 152 decays towards the negative going force signal on the line 119. As the electrode is consumed and/or the electrode system changes position downwardly, the force signal level on the line 119 is reduced. This negative going force signal has a low rate of change with respect to time and the capacitor 160 discharges at a rate which effectively maintains the inverter input signal on the line 152 equal to the force signal level. The output signal from the inverter 150 at any instant of time is thus a negative voltage level substantially corresponding to the positive level of the force signal at that instant. The change in the force signal level is thus compensated for by the compensating signal generator and the adder 138 produced essentially no output signal.

When the electrode engages the furnace charge the sensed axial force change on the electrode system is quite rapid and the resulting negative going force signal has a high rate of change with respect to time. Since the discharge rate of the capacitor 160 is limited, the inverter input signal level is unable to follow the negative going force signal level and the output signal from the inverter does not correspond to the force signal. This results in the adder 138 producing an output signal having a level corresponding to the difference between the inverter output signal on the line 142 and the force signal on the line 119.

The compensating signal generator of FIG. 5 is illustrative of one type of circuit usable in the downward motion force responsive control. The illustrated circuit has been used in the past as a positive peak detector and is described in more detail, as a positive peak detector, in "Operational Amplifier Design and Application", McGraw-Hill, 1971, p.357, FIG. 9.27.

The signal producing circuit 132 responds to the output signal from the adder 138 by conditioning the controller 84 to terminate operation of the motor 54 and stop the downward motion of te electrode system. Referring again to FIG. 4a the signal producing circuit 132 preferably includes a comparator 170, a reference level source 172, and a control relay 174.

The comparator 170 has one input connected to the output of the adder 138 by a line 176 and its other input connected to the level source 172 by a line 178. When the adder output signal level on the line 176 exceeds the reference level on the line 178 the comparator 170 produces an output signal for operating the control relay 174 via an output line 180.

The reference level source 172 can be of any suitable construction but is preferably constructed so that the reference level is adjustable. Adjusting the reference level produced by the source 172 changes the sensitivity of the control 110. In the preferred embodiment of the invention a meter 182 is connected in the line 176 between the adder 138 and the comparator 170 for indicating the adder output level. The meter 182 is usable in adjusting the reference source level on the comparator input line 178 as desired.

The control relay 174 includes contact pairs which are actuated, when the relay is energized, to condition the controller 84 to stop the motor 54, operate an indicating device, such as an annunciator horn 184, and to stabilize the output signal level from the compensating signal generator and thereby hold the relay 174 in its energized condition until the electrode engaging force from the furnace charge is relieved. Referring again to FIG. 5 the normally closed contacts 154 are operated by the control relay 174 so that when the relay 174 is energized the contacts 154 open. This interrupts the discharge circuit for the capacitor 160 and further decay of the inverter input signal on the line 152 is prevented.

The adder input signal on the line 142 is thus maintained substantially constant and the adder output signal continues to maintain the relay 174 energized so long as the electrode remains firmly engaged with the charge. As the electrode engaging force is reduced, the force signal level on the line 119 is positive going. This reduces the output level from the adder 138 until the relay 174 is deenergized via the comparator 170.

When the relay 174 is deenergized, the automatic controller 84 is again enabled to operate the motor 54 to lower the electrode, the horn 184 is silenced and the compensating signal generator 136 is reset for normal operation, i.e. the contacts 156 reclose.

There are other circumstances in which the downward motion control 110 terminates operation of the motor 54 to avoid possibile damage to the electrode system. In the event the electrode 14 is broken off as a result of a furnace charge cave-in the electrode holder 46 can be damaged as a result of an arc being struck between the holder and the broken off electrode portion. However, when the electrode 14 is broken off, the electrode weight is abruptly reduced and this weight reduction has the same affect on the force signal level as engagement of the electrode with the furnace charge. The downward motion control terminates operation of the motor 54 so that the electrode system can not be moved towards the furnace.

Electrode consumption occurring over a period of time can result in the dimension between the tip of the electrode 14 and the electrode holder 46 being too short to enable an optimum arc to be struck between the electrode and the charge without the limit of downward travel of the support structure 16 being reached. As noted previously lower limit switches are normally provided for controlling the extent of downward movement of electrode systems but these switches are prone to failure. If the limit switches fail, the electrode system can reach the physical limit of its travel. Should the motor 54 continue operating to lower the electrode system, the drive cable can be detrained from its sheaves. The downward motion control 110 is effective to stop the motor 54 in the event of lower limit switch failures when the electrode system reaches the physical limit of its downward travel. When the electrode system reaches its travel limit, the force signal is abruptly negative going and the motor 54 is stopped before the drive cable is appreciably slackened.

It should also be noted that the compensating signal generator 136 normally produces compensating signals for any positive going force signal changes regardless of the rate of change of these positive going signals. As a practical matter the only forces which produce a positive going force signal which should be compensated for are those forces exerted on the electrode system as a result of adding additional sections to the electrode 14 to replace electrode sections which have been consumed. Electrode system force changes resulting from the addition of electrode sections obviously have no potential for damaging the electrode system and automatic compensation for these force changes frees the furnace operator from having to reindex the force signal level each time an electrode section is added.

The upward motion force responsive control 112 is effective to stop the electrode drive motor 54 via the automatic controller 84 when an obstruction to upward movement is encountered by the electrode system and to prevent the manual controller 82 from energizing the motor 54 to force the electrode system upwardly against such an obstruction. Obstructions to upward electrode system movement may result from objects becoming wedged between the support column 42 and the guide 40 and resisting upward movement of the electrode system sufficiently to unduly stress the cable 60. The obstruction may also be due to engagement of the electrode system with the mechanical stop 70 in the event of failure of the upper limit switch. The upward motion force responsive control 112 comprises a comparator 206, a reference level source 208 and a control relay 210.

The comparator 206 has one input connected to the force signal on the line 119 via a line 200 and its other input connected to the reference level source 208 via a line 209. The upward reference source 208 provides a pre-established reference level which is preferably the same as the force signal level produced by the electrode system in its fully raised position having an unconsumed electrode and an additional downward force acting on the system, e.g., 500 pounds. When the electrode system encounters an obstruction to its upward movement a positive going force signal is produced on the input line 200 and when the magnitude of the force signal exceeds the pre-established reference level the comparator 206 produces an output signal on a line 211 for engaging the relay 210.

The relay 210 is associated with contacts actuated when the relay is energized to condition the automatic controller 84 to stop upward mode operation of the motor 54 via a line 212; condition the manual controller 90, via a line 214, to prevent the manual controller from operating the motor 54 in a direction to raise the electrode system; and to operate an annunciator horn 204 via a line 216. It should be appreciated that in the event the electrode system encounters an obstruction while being moved upwardly by operation of the manual controller 90, operation of the relay 210 overrides the manual controller to terminate operation of the motor 54.

Since the upward motion control 112 is essentially level sensitive, the absolute value of the force required to terminate operation of the motor varies depending primarily on the current weight of the electrode 14. If maintenance of the sensitivity of the control 112 is desired, the furnace operator an adjust the zero adjusting circuitry 117 relatively frequently. However the force levels at which the control 112 terminates operation of the motor 54 are not generally critical and frequent adjustment of the zero adjusting circuit 117 is not usually essential.

When the electrode system has encountered an obstruction to its upward movement and the drive motor 54 has stopped, the load imposed by the obstruction on the electrode system remains at or about the level at which the upward motion force responsive control 112 stopped the motor. The force signal on the line 119 is therefore maintained at a relatively great positive level. The furnace operator normally conditions the automatic controller 84 for normal furnace operation in order to move the electrode system downwardly and release the load imposed by the obstruction. When the motor 54 operates to move the electrode system downwardly the load imposed by the obstruction is at least partially relieved quite quickly resulting in a rapidly negative going change in the level of the force signal on the line 119.

As noted previously the discriminator circuitry 130 normally responds to any rapidly negative going force signal, regardless of the initial level of the force signal, and tends to terminate operation of the drive motor 54. If permitted to function normally as the load is relieved the downward motion force responsive control could terminate operation of the motor 54. A disabling circuit 220 (FIGS. 4a and 4b) coacts with the force responsive controls 110, 112 to prevent false tripping of the drive motor 54 when the load imposed by an obstruction to upward electrode system movement is relieved.

In the preferred embodiment of the invention, the disabling circuit 220 disables the upward motion force responsive control 110 by altering the normal operation of the compensating signal generator 136. To this end the disabling circuit 220 includes relay contacts 222 which, as illustrated in FIG. 5, are connected in parallel with the diode 156. When an obstruction to upward electrode system movement is encountered the contacts 222 are closed to shunt the diode 156. The contacts 222 are maintained closed until the load imposed by the obstruction is relieved. When the diode 156 is shunted, the signal generator operation is altered so that the inverter input signal value on the line 152 is maintained substantially the same as the value of the force signal on the line 119 regardless of the negative going change rate of the force signal value. In essence, the signal generator merely inverts the force signal and hence the output of the adder remains substantially zero so long as the contacts 222 remain closed.

A preferred construction of the disabling circuit 220 is illustrated in FIG. 4b and comprises a shorting relay 224 for controlling the contacts 222, a relay 226, a memory unit 228 for controlling operation of the relays 224, 226, and a memory resetting circuit including a comparator 230 and a compensating signal generator 232.

The memory unit 228 is preferably a flip-flop circuit, although a latching relay or other suitable memory device could be employed, and provides output terminals Q, Q̄ which are connected to the respective relays 224, 226 by lines 234, 236. In the normal state of the memory 228 the relay 224 is deenergized and the relay 226 is energized. The memory unit 228 has SET and RESET input terminals indicated at S and R, respectively, which control the state of the unit. The set terminal S is connected to the comparator output line 211 of the upward motion force responsive control 112 via a line 240 while the reset terminal R is connected to the output of the comparator 230 via a line 242.

The memory 228 is set by an output signal from the upward motion force responsive control 112 via the line 240 and when set, the memory energizes the shorting relay 224 and deenergizes the relay 226. So long as a load is imposed on the electrode system by an obstruction to upward movement the memory remains in its set state, and when the load is relieved the resetting circuitry resets the memory unit to its normal state, i.e. the shorting relay 224 is deenergized and the relay 226 is energized.

The compensating signal generator 232 in the resetting circuitry is connected to the force signal on the line 119 via a line 246 and is preferably substantially similar in construction and general function to the compensating signal generator 136, with some notable exceptions. The signal generator 232 produces compensating signals which vary according to variations in the force signal except for force signals which are rapidly positive going and therefore characteristic of an obstruction to upward electrode system movement. The rate of change of the output from the signal generator 232 is limited and therefore does not correspond to the rapidly positive going force signals. The diode in the circuit 232 which corresponds to the diode 156 of the FIG. 5 circuit is poled oppositely from the diode 156 in order to enable the limited response to the positive going signals.

The relay contacts (schematically illustrated at 250 in FIG. 4b) in the signal generator 232 which correspond to the contacts 154 of the FIG. 5 circuit are controlled by the relay 226 and are normally open contacts. The contacts 250 are maintained closed by the normally energized relay 226. Since the disabling circuit cannot falsely terminate operation of the motor 54 there are no shorting contacts around the diode in the generator 232.

The output from the signal generator 232 is fed to one input terminals of the comparator 230 via an output line 252. The other input terminal of the comparator is connected to the force signal on the line 119 via an input line 254.

When an obstruction to upward movement of the electrode system is encountered the force signal goes positive rapidly. The memory input terminal S is provided with a set signal from the upward motion control 112 via the line 240 when the load created by the obstruction reaches a predetermined level. The memory changes state causing energization of the shorting relay 224 and denergization of the relay 226. Energization of the relay 224 disables the upward motion control 110, as noted above, while deenergization of the relay 226 opens the relay contacts 250 in the compensating signal generator 232.

Opening of the relay contacts 250 prevents the signal output from the generator 232 from decaying. The output signal from the generator 232 is thus maintained close to the force signal level which existed before the obstruction was encountered and the input signals to the comparator 230 are at substantially different levels. As the load created by the obstruction is relieved during downward motion of the electrode system the force signal level on the comparator input line 254 is reduced to the level of the signal generator output on the line 252 which causes the comparator 230 to change its conductive state and reset the memory 228 to its normal condition.

The upward and downward motion controls 110, 112 are thus returned to their normal operating conditions and automatic operation of the furnace system 10 ensues without false tripping of the motor 54 having occurred.

Figure 6:
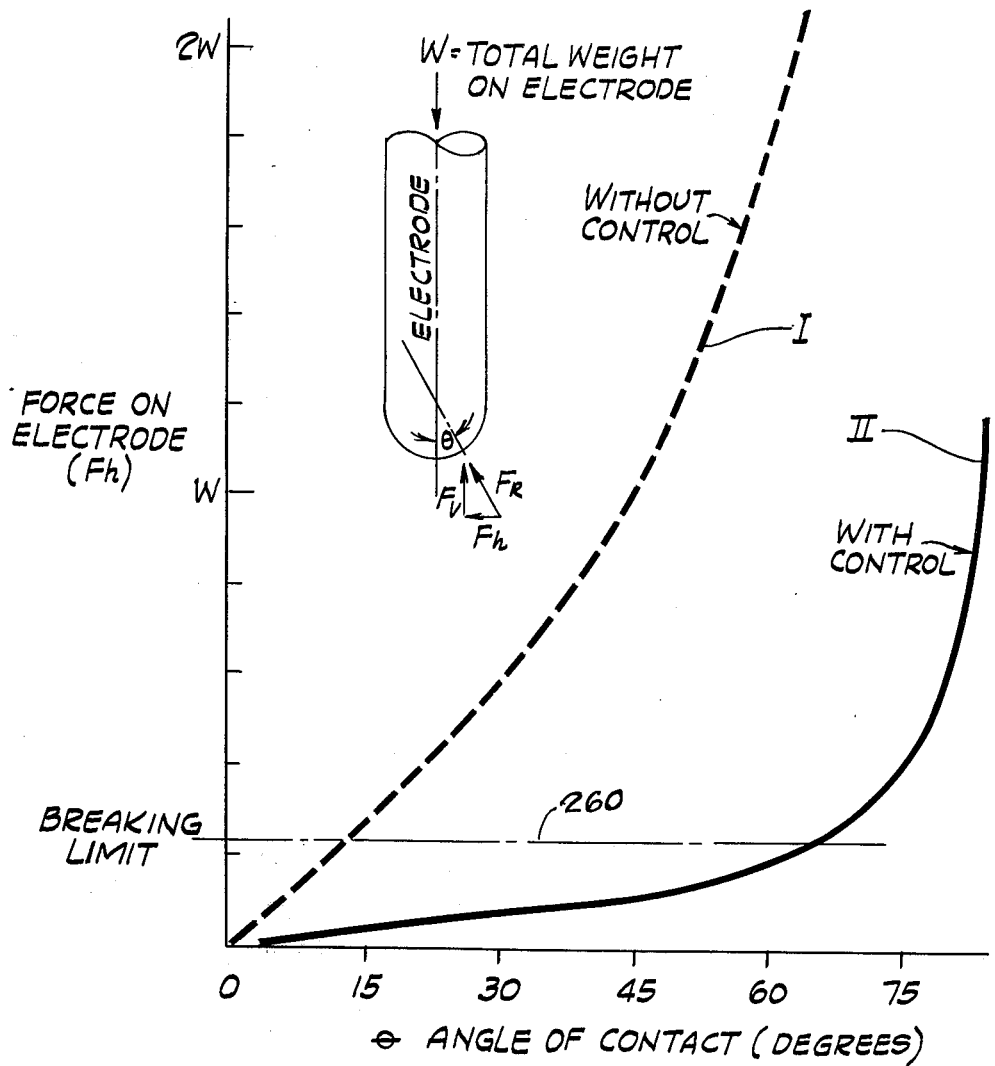
FIG. 6 is a graphic representation of forces acting on an electrode in an arc furnace system constructed according to the invention and forces acting on an electrode of a prior art arc furnace system.

FIG. 6 graphically depicts the breaking force levels applied to nonconsumable electrodes of electrode systems which do not have force responsive controls, versus the breaking force levels applied to an electrode of an electrode system controlled according to the present invention.

The graph of FIG. 6 assumes an electrode is advanced into engagement with the furnace charge with a maximum force W which, for the purpose of the discussion is assumed to be the weight of the electrode system. The ordinate of the graph depicts electrode breaking force in terms of the force W while the abscissa indicates the angle θ between the electrode axis and the resultant furnace charge engaging force.

The curve I of FIG. 6 illustrates that an electrode system without controls can engage the furnace charge with a force W without exceeding the electrode breaking force limit, indicated by the line 260, so long as the angle θ is less than about 15°. The broken line segment of the curve I indicates the projected breaking force levels which would be applied had the electrode remained unbroken.

Curve II illustrates the loci of breaking force levels applied to an electrode when downward travel of the electrode system is terminated by a downward motion force responsive control constructed according to the invention.

The total potential force with which the controlled electrode system remains W but because of the operation of the controlled electrode system the force W is not actually applied to the electrode. The controlled electrode is illustrated as being broken by engaging the charge at an angle of about 65°. It should be appreciated however that by adjusting the level of the reference source 172 (FIG. 4a), the electrode could remain unbroken at contact angles greater than 65°.

As a practical matter, when the angle of contact θ closely approaches 90° the axial force components are of such small magnitude and duration that the control circuitry itself becomes insensitive to them. This insensitivity to small magnitude rapidly changing axial forces is not truly a disadvantage of the new control system because electrode systems are subjected to rapidly changing, small magnitude vibrational forces during normal furnace operation. The new force responsive control does not and should not respond to such vibrational forces by terminating electrode movement.

In addition to stopping electrode motion when the electrode engages the furnace charge, the control system 20 permits the furnace operator to determine the nature of the obstruction which the electrode has engaged. If the material engaging the electrode is somewhat conductive, the meter 108 of the arc condition responsive control 96 will indicate that current is flowing to the material even though optimum arc current and voltage conditions do not exist. The furnace operator can observe the meter 108 and if arc current flow is substantial the operator allows the electrode to remain engaged with the obstruction. The obstruction is then melted or burned away by the current flowing through the electrode and the obstruction and normal furnace operation automatically ensues.

If the meter 100 indicates little or no current flow the obstruction cannot normally be melted or burned away because it is not sufficiently conductive. The operator then raises the electrode a substantial distance away from the charge and shuts down the power to the furnace. Additional material, such as aluminum, is then introduced into the furnace beneath the electrode, power is supplied to the furnace and the operator conditions the controller 84 for automatic operation of the furnace system.

These last mentioned procedures are time consuming and reduce production. By melting or burning away electrode obstructions which are somewhat conductive without having to introduce additional conductive material into the furnace needlessly the furnace production is increased.

In addition to minimizing electrode breakage due to engagement with the furnace charge, the new force responsive control may be used by the furnace operator in "slipping" the electrode. In order to establish a proper length between the electrode tip and the holder, the furnace operator cuts off the arc power and lowers the electrode system until the electrode contacts the furnace charge. The control system 20 indicates that the electrode has contacted the charge and lowering of the electrode system is stopped with the electrode engaging the furnace charge. The electrode holder is then declamped from the electrode and the mast and the holder are moved upwardly relative to the electrode, which is now supported by the charge, until the holder is located a desired distance from the electrode tip. The holder is then reclamped to the electrode and the electrode system is raised relative to the furnace preparatory to resumption of normal furnace operation.

In the past, electrode slipping procedures were such that electrode breakage sometimes occurred. In some circumstances the electrode was engaged with the charge with excessive force, causing the electrode to break off. In other cases the holder was declamped from the electrode when the electrode tip was located relatively far above the charge and the electrode was dropped onto the charge, sometimes resulting in breakage. The present invention substantially reduces the possibility of electrode breakage during a slipping procedure.

Although the invention has been described with particularity, in its preferred form, it should be understood that the present disclosure of the preferred form has been made only by way of example. Numerous adaptations, modifications and uses of the invention may occur to those skilled in the art and the invention is to cover hereby all such adaptations, modifications and uses which fall within the spirit and scope of the appended claims.

What is claimed is:

1. In an electric arc furnace system:
   a. an electrode system comprising an electrode projecting into a furnace along an axis and electrode support structure supported for movement relative to said furnace in directions parallel to said axis;
   b. drive means for movably positioning said electrode system relative to said furnace;
   c. force sensing means cooperating with said electrode system for detecting changes in forces applied to said electrode system, said force sensing means producing force signals which vary as a function of changes in the direction, magnitude and rate of change of magnitude with respect to time of the components of detected force changes acting parallel to said axis; and,
   d. force responsive control means for said drive means, said force responsive control means comprising:
      i. discriminating means for discriminating between force signal values having at least a predetermined rate of change with respect to time caused by said electrode system encountering an obstruction to its movement in said furnace and force signal values having less than said predetermined rate of change with respect to time resulting from weight or positional changes of said electrode system; and,
      ii. control signal means for producing an output control signal for terminating operation of said drive means when said discriminating means detects a force signal caused by an obstruction.

2. The electric arc furnace of claim 1 wherein said discriminating means comprises:
   a. a compensating signal generator responsive to force signal values having less than said predetermined rate of change with respect to time for generating a compensating signal; and,
   b. a signal processing means having a first input connected to said force sensing means, a second input connected to said compensating signal generator and an output connected to said control signal means;
   c. said signal processing means conditioning said control signal means to prevent production of said output control signal in response to sensed force signal values having less than said predetermined rate of change with respect to time.

3. The arc furnace claimed in claim 2 wherein said compensating signal generator comprises elements for preventing generation of a compensating signal in response to force signal values having greater than said predetermined rate of change with respect to time, said signal processing means producing an output for rendering said control signal means effective to produce said output control signal when said compensating signal generator is prevented from generating a compensating signal.

4. The arc furnace claimed in claim 1 wherein said force responsive control means comprises an upward motion force responsive control for terminating operation of said drive means when said electrode system encounters an obstruction to its upward motion and further including disabling means for disabling said discriminating means from terminating operation of said drive means when the force on said electrode system caused by the obstruction to upward motion is relieved.

5. In an electric arc furnace:
   a. an electrode system comprising an electrode projecting into said furnace and electrode support structure supported for movement relative to said furnace;

b. drive means for movably positioning said electrode system relative to said furnace;

c. force sensing means cooperating with said electrode system for detecting changes in forces applied to said electrode system and producing force signals which vary in relation to changes in the detected force; and, d. force responsive control means for said drive means, said force responsive control means comprising:

i. control means responsive to force signal changes indicative of an obstruction to movement of said system downwardly relative to said furnace for terminating operation of said drive means; and, ii. compensating means for detecting force signal changes indicative of force changes on said system resulting from electrode consumption or electrode system position changes and preventing termination of operation of said drive means in response to such changes in force signal levels.

6. The arc furnace according to claim 5 wherein said compensating means includes a compensating signal generator responsive to said force signal changes indicative of electrode consumption and electrode system position changes for generating a compensating signal representing such force changes on the electrode system, and signal processing means responsive to said compensation signal and to said force signal for maintaining said control means ineffective to terminate operation of said drive means so long as a predetermined relationship between said compensating signal and said force signal is maintained.

7. The arc furnace claimed in claim 6 wherein said compensating signal generator includes elements for limiting the output of said compensating signal generator and preventing said compensating signal generator from producing compensating signals representative of force signal values caused by rapidly occurring sensed force changes, said control means rendered effective to terminate operation of said drive means in response to the concurrence of said limited compensating signal generator output and said force signal values.

8. In an electric arc furnace:

a. an electrode system comprising an electrode projecting into said furnace and electrode support structure supported for movement relative to said furnace;

b. drive means for movably positioning said electrode system relative to said furnace;

c. force sensing means cooperating with said electrode system for detecting changes in forces applied to said electrode system and producing force signals which change in relation to changes in the detected force; and, d. force responsive control means for said drive means effective to terminate operation of said drive means in response to force signal changes related to a detected change in force resisting electrode system movement having at least a predetermined rate of change of magnitude with respect to time and which is indicative of an obstruction to movement of said electrode system toward said furnace.

9. The electric arc furnace claimed in claim 8 further including a second force responsive control means for terminating operation of said drive means in response to force signals indicative of an obstruction to motion of said electrode system away from said furnace, said second force responsive control means terminating operation of said drive means when the magnitude of said force signal exceeds a predetermined value.

10. The arc furnace claimed in claim 9 further including disabling means for disabling said first force responsive means in response to operation of said second force responsive means to terminate operation of said drive means.

11. In an electric arc furnace:

a. an electrode system comprising an electrode projecting into said furnace and electrode support structure supported for movement relative to said furnace;

b. drive means for movably positioning said electrode system relative to said furnace;

c. force sensing means cooperating with said electrode positioning system for detecting changes in forces applied to said electrode system and producing electrical force signals which vary in accordacne with changes in the magnitude, sense direction and rate of change of magnitude with respect to time of detected force changes; and, d. force responsive control means for said drive means, said force responsive control means comprising:

i. control means responsive to force signal variations caused by force changes of a predetermined sense direction and having at least a predetermined rate of change of mangitude with respect to time for terminating operation of said drive means, said force changes being indicative of an obstruction to movement of said electrode system toward said furnace; and, ii. compensating means for detecting force signal variations caused by force changes in said predetermined sense direction having less than said predetermined rate of change of magnitude with respect to time and preventing operation of said control means in response to such variations.

12. A method of controlling movement of an electrode system in an electric arc furnace system comprising:

a. moving the electrode system relative to a furnace charge;

b. sensing changes in forces acting on the electrode system;

c. producing a force signal having values which vary in accordance with the direction of force changes acting on said electrode system and the rate of change of magnitude with respect to time of said force changes;

d. producing a compensating signal corresponding to force changes acting on the electrode system in a direction away from the furnace charge having less than a predetermined rate of change of magnitude with respect to time;

e. comparing said force signal and said compensating signal; and, f. controlling movement of the electrode system toward the furnace charge in accordance with the compared relationship between said force signal and said compensating signal.

13. A method as claimed in claim 12 wherein producing a compensating signal includes sensing said force signal and generating said compensating signal in response to said sensed force signal.

14. A method as claimed in claim 13 further including limiting the response of said compensating signal to force signals produced by forces acting away from said furnace charge at greater than said predetermined rate of change of magnitude with respect to time, and stopping motion of said electrode system in response to comparing a limited compensating signal with a force signal produced by a force acting away from said furnace charge at greater than said predetermined rate of change of magnitude with respect to time.

15. A method of controlling movement of an electrode system in an electric arc furnace system to minimize breakage of the electrode comprising:
   a. positioning the electrode system relative to a furnace charge;
   b. sensing changes in forces acting on the electrode system;
   c. discriminating between first sensed force changes resulting from force acting on the electrode system in a direction away from the furnace charge and having at least a predetermined rate of change of magnitude with respect to time and second force changes resulting from other forces acting on the electrode system; and,
   d. preventing motion of the electrode system toward the furnace charge in response to said first sensed force changes.

16. A method as claimed in claim 15 further including producing a force signal which varies according to sensed changes in forces acting on said electrode system, producing a compensating signal in response to force signal variations caused by said second force changes, comparing said compensating signal and said force signal and enabling motion of said electrode system toward said furnace charge regardless of changes in said force signal so long as force signal changes are compensated by said compensating signal.

17. A method as claimed in claim 15 further including producing a force signal which varies according to sensed changes in forces acting on said electrode system, producing a compensating signal characteristic of force signal changes produced by said second force changes, comparing said force signal with said compensating signal and enabling motion of said electrode system toward said furnace charge so long as force signal changes are compensated by compensating signal changes.

* * * * *